United States Patent
Sugiyama et al.

(10) Patent No.: US 9,315,112 B2
(45) Date of Patent: Apr. 19, 2016

(54) POWER SOURCE APPARATUS FOR ELECTRICALLY POWERED VEHICLE AND CONTROL METHOD THEREFOR

(75) Inventors: Yoshinobu Sugiyama, Toyota (JP); Wanleng Ang, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 178 days.

(21) Appl. No.: 13/636,468

(22) PCT Filed: Apr. 13, 2011

(86) PCT No.: PCT/JP2011/059148
§ 371 (c)(1),
(2), (4) Date: Sep. 21, 2012

(87) PCT Pub. No.: WO2012/140746
PCT Pub. Date: Oct. 18, 2012

(65) Prior Publication Data
US 2014/0203634 A1 Jul. 24, 2014

(51) Int. Cl.
*B60L 11/18* (2006.01)
*B60L 1/00* (2006.01)
(Continued)

(52) U.S. Cl.
CPC ............... *B60L 11/1861* (2013.01); *B60L 1/00* (2013.01); *B60L 1/003* (2013.01); *B60L 1/14* (2013.01);
(Continued)

(58) Field of Classification Search
CPC ............ Y02T 10/7005; Y02T 10/7077; Y02T 10/6217; Y02T 10/642; Y02T 10/7044; Y02T 10/705; Y02T 10/7216; Y02T 10/72; Y02T 10/7275; Y02T 90/127; Y02T 90/14; B60R 16/03; B60R 16/0315; B60L 11/14; B60L 1/00; B60L 1/003; B60L 1/14; B60L 11/123; B60L 11/1812; B60L 11/1816; B60L 11/1861; B60L 15/007; B60L 15/2009; B60L 3/04; B60L 7/14; B60L 2210/10; B60L 2210/30; B60L 2210/40; B60L 2220/14; B60L 2240/36; B60L 2240/423; B60L 2240/545; B60L 2250/26; H02J 3/381; Y02E 60/721; Y04S 10/126
USPC .......................................... 307/9.1
See application file for complete search history.

(56) References Cited

U.S. PATENT DOCUMENTS

2002/0195290 A1* 12/2002 Hayakawa ..................... 180/277
2009/0103341 A1* 4/2009 Lee et al. ........................ 363/124
(Continued)

FOREIGN PATENT DOCUMENTS

JP A-2002-176704 6/2002
JP A-2007-159236 6/2007
(Continued)

OTHER PUBLICATIONS

Jun. 14, 2011 International Search Report issued in International Application No. PCT/JP2011/059148 (with translation).

*Primary Examiner* — Thienvu Tran
*Assistant Examiner* — Brian K Baxter
(74) *Attorney, Agent, or Firm* — Oliff PLC (57) ABSTRACT

During external charging, a charger converts AC electric power from an external power supply into electric power for charging a main battery. An AC/DC converter converts the AC electric power on the power line into auxiliary electric power. The charger is further capable of executing power conversion for converting output electric power of the main battery into AC electric power for output to the power line. While a vehicle is running, normally, the charger and the AC/DC converter are stopped, and the auxiliary electric power obtained by converting the output electric power of the main battery by a main DC/DC converter is output. At the time of regenerative braking of the vehicle, where charging of the main battery is prohibited or restricted, the charger and the AC/DC converter are further operated to intentionally increase loss power, thereby generating auxiliary electric power.

12 Claims, 6 Drawing Sheets

(51) Int. Cl.
*B60L 7/14* (2006.01)
*H02J 3/38* (2006.01)
*B60L 1/14* (2006.01)
*B60L 11/12* (2006.01)
*B60L 11/14* (2006.01)
*B60L 15/00* (2006.01)
*B60L 15/20* (2006.01)
*B60L 3/04* (2006.01)

(52) U.S. Cl.
CPC ... *B60L 3/04* (2013.01); *B60L 7/14* (2013.01); *B60L 11/123* (2013.01); *B60L 11/14* (2013.01); *B60L 11/1812* (2013.01); *B60L 11/1816* (2013.01); *B60L 15/007* (2013.01); *B60L 15/2009* (2013.01); *H02J 3/381* (2013.01); *B60L 2210/10* (2013.01); *B60L 2210/30* (2013.01); *B60L 2210/40* (2013.01); *B60L 2220/14* (2013.01); *B60L 2240/36* (2013.01); *B60L 2240/423* (2013.01); *B60L 2240/545* (2013.01); *B60L 2250/26* (2013.01); *Y02E 60/721* (2013.01); *Y02T 10/6217* (2013.01); *Y02T 10/642* (2013.01); *Y02T 10/7005* (2013.01); *Y02T 10/705* (2013.01); *Y02T 10/7044* (2013.01); *Y02T 10/7077* (2013.01); *Y02T 10/7216* (2013.01); *Y02T 10/7241* (2013.01); *Y02T 10/7275* (2013.01); *Y02T 90/127* (2013.01); *Y02T 90/14* (2013.01); *Y04S 10/126* (2013.01)

(56) References Cited

U.S. PATENT DOCUMENTS

| | | | |
|---|---|---|---|
| 2009/0115375 A1* | 5/2009 | Iida | B60L 11/123 320/138 |
| 2010/0100264 A1* | 4/2010 | Kato | B60K 6/445 701/22 |
| 2010/0100265 A1* | 4/2010 | Kato | B60K 6/445 701/22 |
| 2011/0307132 A1* | 12/2011 | Hashimoto | 701/22 |
| 2012/0072066 A1* | 3/2012 | Kato et al. | 701/22 |
| 2012/0133204 A1* | 5/2012 | Ang et al. | 307/10.1 |
| 2013/0134908 A1* | 5/2013 | Sugiyama et al. | 318/3 |

FOREIGN PATENT DOCUMENTS

| | | | | |
|---|---|---|---|---|
| JP | A-2007-174867 | | 7/2007 | |
| JP | A-2008-193772 | | 8/2008 | |
| JP | A-2009-225587 | | 10/2009 | |
| JP | 2010-141997 | * | 6/2010 | |
| JP | A-2010-220381 | | 9/2010 | |
| WO | WO 2010137100 A1 | * | 12/2010 | B60K 6/365 |
| WO | WO 2011/036758 A1 | | 3/2011 | |
| WO | WO 2011024285 A1 | * | 3/2011 | |
| WO | WO 2011128750 A2 | * | 10/2011 | |

* cited by examiner

POWER SOURCE APPARATUS FOR ELECTRICALLY POWERED VEHICLE AND CONTROL METHOD THEREFOR

TECHNICAL FIELD

This invention relates to a power supply apparatus for an electrically powered vehicle and to a method of controlling the same. More particularly, this invention relates to a power supply apparatus for an electrically powered vehicle equipped with a main power storage device and a subpower storage device which are chargeable by a power supply outside the vehicle.

BACKGROUND ART

An electric vehicle, a hybrid vehicle, or a fuel cell vehicle has been known as an electrically powered vehicle configured such that a traction motor can be driven using electric power from a power storage device mounted on the vehicle, represented by a secondary battery. For an electrically powered vehicle, a configuration for charging the power storage device mounted on the vehicle by a power supply outside the vehicle (hereinafter also simply referred to as an "external power supply") has been proposed. Charging of the power storage device by the external power supply will hereinafter also be simply referred to as "external charging".

Japanese Patent Laying-Open No. 2009-225587 (PTL 1) describes a configuration of an electrically powered vehicle equipped with a power storage device chargeable by an external power supply. In the electrically powered vehicle described in PTL 1, in order to ensure both charging efficiency and operation of an auxiliary load system at the time of external charging, the auxiliary load system including an auxiliary battery is connected to an electric power path between a power converter for external charging and a main battery.

Meanwhile, in the electrically powered vehicle, energy is recovered by generation of regenerative electric power by a traction motor during deceleration. When charging of the power storage device mounted on the vehicle is prohibited or heavily restricted, however, regenerative electric power cannot be recovered by the power storage device. Under such circumstances, control for giving room for the generation of regenerative electric power is described in Japanese Patent Laying-Open No. 2008-193772 (PTL 2) and Japanese Patent Laying-Open No. 2007-159236 (PTL 3).

Japanese Patent Laying-Open No. 2008-193772 (PTL 2) describes control in which, where moving down of a vehicle is detected, electric power stored in a battery (power storage device) or regenerative electric power of an electric motor is consumed by an electric load, such as a compressor. Thus, satisfactory starting performance on an uphill road can be achieved.

Japanese Patent Laying-Open No. 2007-159236 (PTL 3) describes control in which, where regenerative electric power is generated by a traction motor, an auxiliary DC/DC converter is controlled in accordance with electric power that can be received by a main power storage device, to charge or discharge a subpower storage device.

CITATION LIST

Patent Literature

PTL 1: Japanese Patent Laying-Open No. 2009-225587
PTL 2: Japanese Patent Laying-Open No. 2008-193772
PTL 3: Japanese Patent Laying-Open No. 2007-159236

SUMMARY OF INVENTION

Technical Problem

In the externally chargeable electrically powered vehicle described in PTL 1 as well, vehicle braking force is generated by a combination of regenerative braking force generated by the traction motor and mechanical braking force generated by hydraulic pressure or the like. Thus, where charging of the main power storage device is restricted or prohibited, it may be difficult to generate regenerative braking force by the electric motor. In such cases, an increased frequency of using a braking mechanism for generating mechanical braking force may cause overheating of the braking mechanism.

This invention was made in order to solve these problems, and an object of the invention is to provide, in an electrically powered vehicle equipped with a main power storage device and a subpower storage device which are externally chargeable, control for generating regenerative braking force also where charging of the main power storage device is prohibited or restricted.

Solution to Problem

According to one aspect of this invention, a power supply apparatus for an electrically powered vehicle includes a main power storage device, a power control unit, a subpower storage device having output voltage lower than that of the main power storage device, a power line, a charger, a first power converter, a second power converter, and a control device for controlling operation of each of the charger, the first power converter, and the second power converter. The power control unit is configured to control output of an electric motor by power conversion between the main power storage device and the electric motor configured to be capable of supplying and receiving driving force to and from a wheel. The power line is connected to the subpower storage device to supply auxiliary electric power for operating an auxiliary load. The first power converter is configured to convert output electric power of the main power storage device into auxiliary electric power for output to the power line. The charger is configured to execute, during external charging, first power conversion for converting electric power from an external power supply into electric power for charging the main power storage device. The second power converter is configured to be connected to a predetermined node on a path of the first power conversion and convert electric power on the predetermined node into the auxiliary electric power for output to the power line. The first power converter outputs the auxiliary electric power by operating in response to a first auxiliary power feed instruction from the control device. The charger is configured to execute, while the vehicle is running, second power conversion for converting electric power of the main power storage device into electric power to be input to the second power converter and outputting the converted electric power to the predetermined node, by at least partial reverse conversion of the first power conversion, in response to a second auxiliary power feed instruction from the control device. The second power converter outputs, while the vehicle is running, the auxiliary electric power by operating in response to the second auxiliary power feed instruction from the control device. The control device controls, while the vehicle is running, the charger, the first power converter, and the second power converter to generate the auxiliary electric power, by switching between a first mode in which only the first auxiliary power feed instruction is generated and a second mode in which both the first and second auxiliary power feed instructions are generated, in accordance with at least one of charge restriction of the main power storage device and regenerative electric power from the electric motor.

Preferably, the control device selects, while the vehicle is running, the second mode when charging of the main power storage device is prohibited.

Further, preferably, the control device selects, while the vehicle is running, the second mode when the electric motor is generating regenerative electric power and a charge power upper limit value for the main power storage device is lower than a predetermined value.

Preferably, the control device controls, when the second mode is selected, a ratio between output electric power of the first power converter and output electric power of the second power converter, in accordance with total output electric power from the first and second power converters.

Further, preferably, the control device sets the ratio when the second mode is selected, based on a map obtained by finding in advance the ratio at which a total of losses in the first and second power converters is maximum, for each total output electric power.

According to another aspect of this invention, there is provided a method of controlling a power supply apparatus for an electrically powered vehicle including a main power storage device and a subpower storage device having output voltage lower than that of the main power storage device, wherein the power supply apparatus includes a power control unit, a power line, a first power converter, a charger, and a second power converter. The power control unit is configured to control output of an electric motor by power conversion between the main power storage device and the electric motor configured to be capable of supplying and receiving driving force to and from a wheel. The power line is connected to the subpower storage device, for supplying auxiliary electric power for operating an auxiliary load. The first power converter converts output electric power of the main power storage device into the auxiliary electric power for output to the power line. The charger is configured to execute, during external charging, first power conversion for converting electric power from an external power supply into electric power for charging the main power storage device. The second power converter is configured to be connected to a predetermined node on a path of the first power conversion and convert electric power on the predetermined node into the auxiliary electric power for output to the power line. The first power converter outputs the auxiliary electric power by operating in response to a first auxiliary power feed instruction. The charger is configured to execute, while the vehicle is running, second power conversion for converting electric power of the main power storage device into electric power to be input to the second power converter and outputting the converted electric power to the predetermined node, by at least partial reverse conversion of the first power conversion, in response to a second auxiliary power feed instruction. The second power converter outputs, while the vehicle is running, the auxiliary electric power by operating in response to the second auxiliary power feed instruction. The method includes the steps of selecting, while the vehicle is running, one of a first mode in which only the first auxiliary power feed instruction is generated and a second mode in which both the first and second auxiliary power feed instructions are generated, in accordance with at least one of charge restriction of the main power storage device and regenerative electric power from the electric motor, and controlling the charger, the first power converter, and the second power converter to generate auxiliary electric power in accordance with the selected first or second mode.

Preferably, the step of controlling includes the step of setting, when the second mode is selected, a ratio between output electric power of the first power converter and output electric power of the second power converter, in accordance with total output electric power from the first and second power converters.

Further, preferably, in the step of setting, the ratio when the second mode is selected is set, based on a map obtained by finding in advance the ratio at which a total of losses in the first and second power converters is maximum, for each total output electric power.

Advantageous Effects of Invention

In accordance with this invention, in an electrically powered vehicle equipped with a main power storage device and a subpower storage device that are externally chargeable, regenerative braking force can be generated also where charging of the main power storage device is prohibited or restricted.

DESCRIPTION OF EMBODIMENTS

Embodiments of the present invention will hereinafter be described in detail with reference to the drawings. In the following, the same or corresponding portions in the figures are labeled with the same reference characters, and description thereof will not be repeated in principle.

Figure 1:
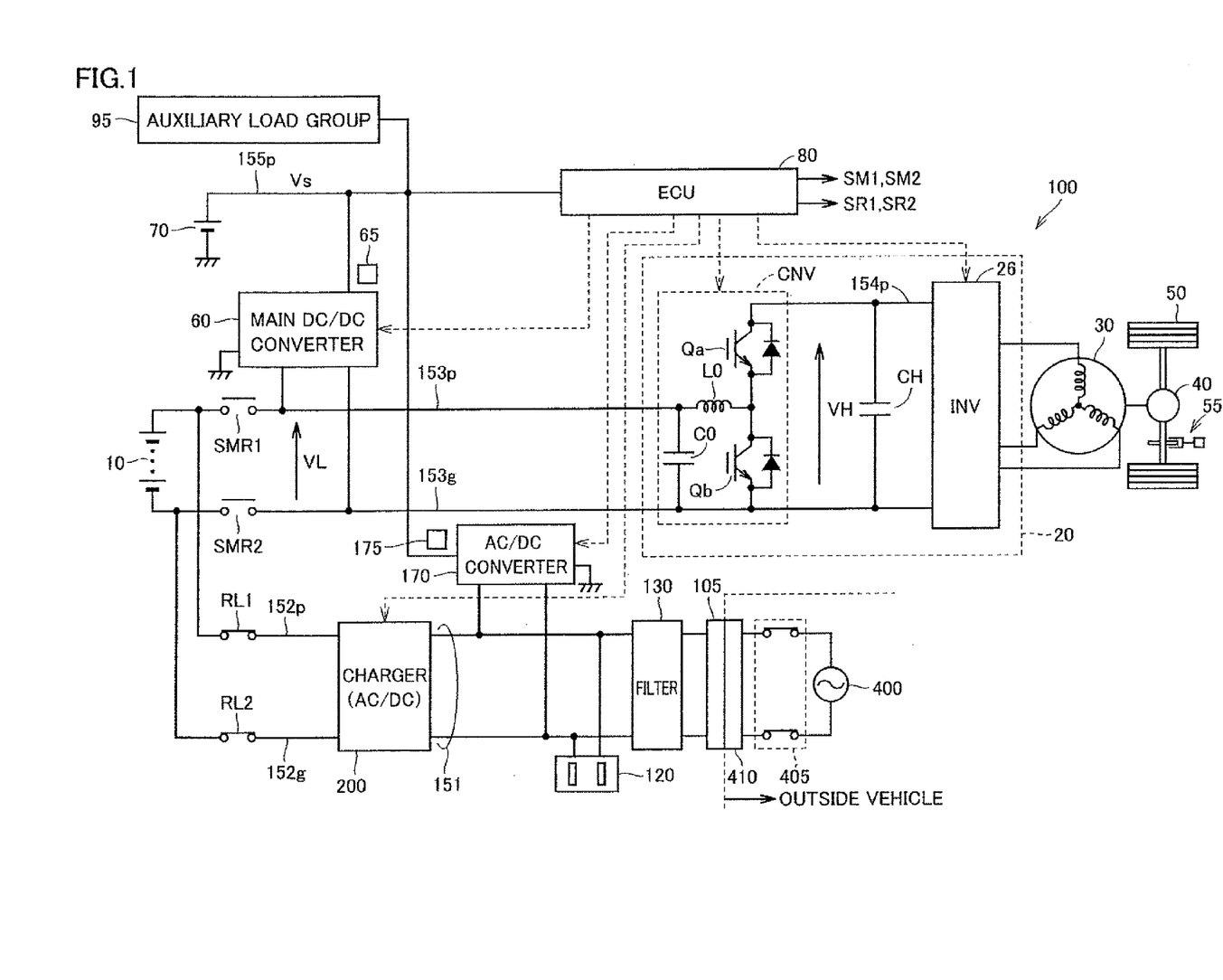
FIG. 1 is a block diagram showing an exemplary configuration of a power supply apparatus for an electrically powered vehicle in accordance with an embodiment of the present invention.

FIG. 1 is a block diagram showing an exemplary configuration of a power supply apparatus for an electrically powered vehicle in accordance with an embodiment of the present invention.

With reference to FIG. 1, an electrically powered vehicle 100 includes a main battery 10, a power control unit (PCU) 20, a motor generator 30, a power transmission gear 40, a driving wheel 50, a braking mechanism 55, and an ECU (Electronic Control Unit) 80.

Main battery 10 is shown as an example of a "main power storage device", and is representatively formed of a secondary battery, such as a lithium ion battery or a nickel metal hydride battery. For example, output voltage of main battery 10 is about 200 V. Alternatively, the main power storage device may be formed of an electric double layer capacitor, or a combination of a secondary battery and a capacitor.

PCU 20 converts electric power charged to/discharged from main battery 10 into electric power for controlling driving of motor generator 30. For example, motor generator 30 is formed of a permanent magnet type three-phase synchronous electric motor, and PCU 20 is formed to include an inverter 26.

An output torque of motor generator 30 is transmitted through power transmission gear 40, which is formed of a reduction gear or a power split device, to the driving wheel, causing electrically powered vehicle 100 to run. At the time of regenerative braking of electrically powered vehicle 100, motor generator 30 can generate electric power by rotational force of driving wheel 50. The generated electric power is then converted by PCU 20 into electric power for charging main battery 10.

Braking mechanism 55 generates mechanical braking force directed to wheel 50. Braking mechanism 55 is representatively formed of a hydraulic brake that generates friction braking force in accordance with a supply of hydraulic pressure. At the time of operation of a brake pedal of electrically powered vehicle 100, the entire braking force corresponding to the operation of the brake pedal is ensured by a sum of the mechanical braking force from braking mechanism 55 and regenerative braking force from motor generator 30. That is, ECU 80 causes regenerative braking force to be generated from motor generator 30 within a range that does not cause overcharge of main battery 10, by reflecting a charge power upper limit value Win for main battery 10. On the other hand, a difference between the entire braking force and the regenerative braking force is ensured by the mechanical braking force from braking mechanism 55. Therefore, where charging of main battery 10 is prohibited, it is necessary that only braking mechanism 55 operate continuously. In such cases, there is a concern that braking mechanism 55 may be overheated.

In a hybrid vehicle having an engine (not shown) in addition to motor generator 30, vehicle driving force necessary for electrically powered vehicle 100 is generated by coordinated operation of the engine and motor generator 30. Here, it is also possible to charge main battery 10 using electric power generated by engine rotation.

That is, electrically powered vehicle 100 represents a vehicle equipped with a traction motor, and includes a hybrid vehicle in which the vehicle driving force is generated by an engine and an electric motor, an electric vehicle and a fuel cell vehicle which are not equipped with an engine, and the like.

The "power supply apparatus for the electrically powered vehicle" has the configuration of electrically powered vehicle 100 shown in the figure, with motor generator 30, power transmission gear 40, and driving wheel 50 being removed. The configuration of the power supply apparatus will hereinafter be described in detail.

Power control unit (PCU) 20 includes a converter CNV, a smoothing capacitor CH, and inverter 26.

Converter CNV is configured to perform DC voltage conversion between DC voltage VL across power lines 153$p$ and 153$g$ and DC voltage VH across power lines 154$p$ and 154$g$.

Power lines 153$p$, 153$g$ are electrically connected to a positive electrode terminal and a negative electrode terminal of main battery 10 through system main relays SMR1 and SMR2, respectively. Smoothing capacitor CH is connected to power lines 154$p$, 154$g$ and smoothes DC voltage. Similarly, a smoothing capacitor C0 is connected to power lines 153$p$, 153$g$ and smoothes DC voltage VL.

Converter CNV is formed as a chopper circuit including power semiconductor switching elements Qa, Qb, a reactor L0, and smoothing capacitor C0, as shown in FIG. 1. In the present embodiment, IGBTs (Insulated Gate Bipolar Transistors) are shown as exemplary power semiconductor switching elements (hereinafter also simply referred to as "switching elements"). However, any elements that can be controlled to be turned on or off, such as power MOS (Metal Oxide Semiconductor) transistors, power bipolar transistors, or the like, can be used as the switching elements.

Anti-parallel diodes are connected to switching elements Qa and Qb, respectively, and therefore, converter CNV can execute bi-directional voltage conversion between power lines 153$p$ and 154$p$. Alternatively, by fixing switching element Qa as an upper arm element in an ON-state while fixing switching element Qb as a lower arm element in an OFF-state, converter CNV can be operated to equalize the voltages of power lines 154$p$ and 153$p$ (VH=VL).

Inverter 26 is a general three-phase inverter, and therefore, a detailed circuit configuration thereof is not shown. For example, inverter 26 is formed such that an upper arm element and a lower arm element are arranged for each phase, and a connection point between the upper and lower arm elements of each phase is connected to a stator coil winding of the corresponding phase of motor generator 30.

While electrically powered vehicle 100 is running, each switching element of inverter 26 is controlled to be turned on/off by ECU 80, whereby the DC voltage on power line 154$p$ is converted into three-phase AC voltage for supply to motor generator 30. At the time of regenerative braking operation of electrically powered vehicle 100, each switching element of inverter 26 is controlled to be turned on/off by ECU 80 such that the AC voltage from motor generator 30 is converted into DC voltage for output to power line 154$p$.

ECU 80 is formed of an electronic control unit incorporating a CPU (Central Processing Unit) and a memory not shown, and configured to perform operation processing using detection values from various sensors, based on a map and a program stored in the memory. At least a portion of ECU 80 may also be configured to execute predetermined numerical/logical operation processing by means of hardware such as an electronic circuit. ECU 80 is comprehensively represented as a block having a control function during running of, and at the time of external charging of, electrically powered vehicle 100. ECU 80 operates when power supply voltage of a low voltage system is supplied from a power line 155$p$.

The power supply apparatus for electrically powered vehicle 100 includes, as a configuration of the low voltage system (auxiliary machinery system), a main DC/DC converter 60, an auxiliary battery 70, and power line 155$p$. Auxiliary battery 70 is connected to power line 155$p$. Auxiliary battery 70 is shown as one example of a "subpower storage device". For example, auxiliary battery 70 is formed of a lead-acid battery. Output voltage of auxiliary battery 70 corresponds to power supply voltage Vs of the low voltage system. Rating of power supply voltage Vs is lower than the output voltage of main battery 10, and is about 12 V, for example.

An output side of main DC/DC converter 60 is connected to power line 155$p$. An input side of main DC/DC converter 60 is connected to power lines 153$p$, 153$g$. Main DC/DC converter 60 converts output electric power of main battery 10 into auxiliary electric power (level of power supply voltage Vs) for output to power line 155$p$. The output voltage (DC voltage VL) of main battery 10 is down-converted by this power conversion to power supply voltage Vs for the auxiliary machinery system. Main DC/DC converter 60 is representatively a switching regulator including a semiconductor switching element (not shown), and any known circuit configuration may be applied.

A group of auxiliary loads 95 of the low voltage system is connected to power line 155p. Auxiliary load group 95 includes, for example, audio equipment, navigation equipment, and illumination equipment (hazard lamp, room lamp, head lamp, and the like). The auxiliary load group consumes electric power by operating in accordance with a user's operation during running and at the time of external charging of the vehicle.

Further, the power supply apparatus for electrically powered vehicle 100 includes, as a configuration of an external charging system of main battery 10, a charging connector 105, an AC receptacle 120, an LC filter 130, an AC/DC converter 170, a charger 200, and relays RL1, RL2.

Charging connector 105 is connected to a charging plug 410 of a charging cable, which is in a state connected to external power supply 400, and is thereby electrically connected to external power supply 400. It is assumed that the charging cable incorporates a relay 405 for cutting off a charging path of external power supply 400. Generally, external power supply 400 is implemented by a commercial AC power supply.

It is noted that, in place of the configuration shown in FIG. 1, a configuration may be used in which external power supply 400 and electrically powered vehicle 100 are electromagnetically coupled in a non-contact manner for supply of electric power. Specifically, a primary coil may be provided on the external power supply side and a secondary coil may be provided on the vehicle side, and electric power may be supplied from external power supply 400 to electrically powered vehicle 100 by utilizing mutual inductance between the primary and secondary coils. Even when such external charging is performed, the configuration including LC filter 130 and the like for converting electric power supplied from external power supply 400 can be common.

A power line 151 electrically connects charging connector 105 and charger 200 to each other. LC filter 130 is connected to power line 151 as interposed therein and removes a harmonic component of AC voltage.

Charger 200 converts the AC voltage from external power supply 400, transmitted to power line 151, into DC voltage for charging main battery 10. The converted DC voltage is output across power lines 152p and 152g. Here, the DC voltage on power lines 152p and 152g is controlled to a voltage level suitable for charging main battery 10.

Relay RL1 is electrically connected between power line 152p and a positive electrode of main battery 10. Relay RL2 is electrically connected between power line 152g and a negative electrode of main battery 10.

Each of relays RL1, RL2 and system main relays SMR1, SMR2 is representatively formed of an electromagnetic relay that is closed (turned on) when excitation current from a not-shown excitation circuit is supplied, and is opened (turned off) when excitation current is not supplied. It is noted that any circuit element may be used as the relay or the system main relay, so long as it is a switch that can control conduction (ON)/non-conduction (OFF) of a conduction path.

ECU 80 generates control commands SM1, SM2 and SR1, SR2 for controlling system main relays SMR1, SMR2 and relays RL1, RL2 to be turned on or off. In response to each of control commands SM1, SM2 and SR1, SR2, excitation current for the corresponding system main relay or relay is generated, with auxiliary battery 70 serving as the power supply.

AC receptacle 120 is connected to power line 151. Electric equipment (not shown) connected to AC receptacle 120 can operate using the AC electric power on power line 151. When the charging cable is connected, AC electric power can be supplied from AC receptacle 120 using the electric power from external power supply 400. Further, by forming charger 200 as a bi-directional power converter, AC electric power can be supplied from AC receptacle 120 also when the charging cable is not connected. In this case, charger 200 needs to have a function of converting the output electric power of main battery 10 into AC electric power equivalent to the AC electric power from external power supply 400. In other words, in an electrically powered vehicle with AC receptacle 120, charger 200 is preferably provided with the function of bi-directional power conversion. It is noted for confirmatory purposes, however, that the present invention can also be applied to an electrically powered vehicle without AC receptacle 120.

Figure 2:
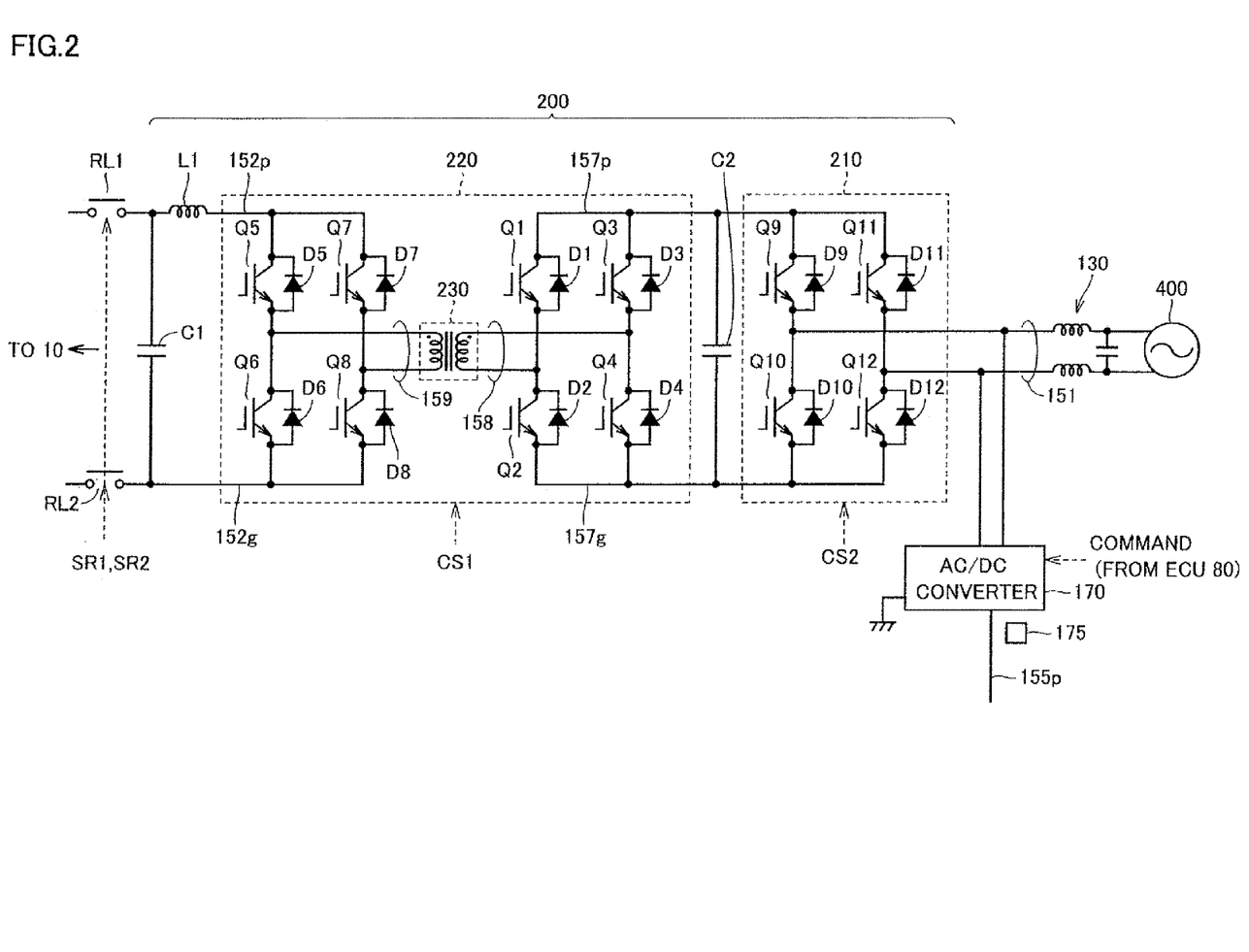
FIG. 2 is a circuit diagram for illustrating an exemplary configuration of a charger shown in FIG. 1.

FIG. 2 is a circuit diagram for illustrating an exemplary configuration of charger 200 shown in FIG. 1.

With reference to FIG. 2, charger 200 includes a power conversion unit 210, a power conversion unit 220, a smoothing reactor L1, and smoothing capacitors C1, C2.

Power conversion unit 210 includes power semiconductor switching elements Q9 to Q12. Anti-parallel diodes D9 to D12 are disposed for switching elements Q9 to Q12, respectively.

Switching elements Q9 to Q12 form a full bridge circuit (hereinafter also referred to as the first full bridge circuit) between power line 151 and power lines 157p, 157g. Switching elements Q9 to Q12 are controlled to be turned on or off in response to a control signal CS2 from ECU 80 (FIG. 1).

Power conversion unit 220 includes switching elements Q1 to Q4 and Q5 to Q8, and an isolation transformer 230. Anti-parallel diodes D1 to D8 are connected to switching elements Q1 to Q8, respectively. Switching elements Q1 to Q8 are controlled to be turned on or off in response to a control signal CS1 from ECU 80.

Switching elements Q1 to Q4 form a full bridge circuit (hereinafter also referred to as the second full bridge circuit) between a power line 158 and power lines 157p, 157g. Switching elements Q5 to Q8 form a full bridge circuit (hereinafter also referred to as the third full bridge circuit) between a power line 159 and power lines 152p, 152g.

Each of the full bridge circuits in power conversion units 210, 220 can execute bi-directional AC/DC power conversion by on/off control of the switching elements, as is well known. It is also known that a level of DC voltage (current) or AC voltage (current) can be controlled by duty ratio control of the switching elements under the on-off control.

Isolation transformer 230 has a primary side to which power line 158 is connected, and a secondary side to which power line 159 is connected. As is well known, isolation transformer 230 is configured to convert AC voltage in accordance with the number of turns while electrically isolating the primary and secondary sides from each other.

Smoothing capacitor C2 smoothes the DC voltage on power lines 157p, 157g. Smoothing capacitor C1 and smoothing reactor L1 smooth the DC voltage and DC current on power lines 152p, 152g.

Next, operation of charger 200 will be described in greater detail. At the time of external charging, charger 200 performs power conversion as described below (first power conversion).

At the time of external charging, ECU 80 turns on relays RL1, RL2. Further, once conditions for permitting external charging are satisfied, relay 405 within the charging cable is turned on. Thus, AC voltage from external power supply 400 is supplied to power line 151.

The first full bridge circuit (Q9 to Q12) of power conversion unit 210 converts the AC voltage on power line 151 into DC voltage, for output to power lines 157p, 157g. Here, power conversion unit 210 controls the AC/DC conversion to improve a power factor of the power supplied from external power supply 400. That is, power conversion unit 210 preferably also operates as a PFC (Power Factor Correction) circuit at the time of external charging.

Generally, the voltage on power lines 157p, 157g at the time of external charging is controlled by power conversion unit 210 to DC voltage higher than an amplitude of the AC voltage from external power supply 400.

In power conversion unit 250, the second full bridge circuit (Q1 to Q4) converts the DC voltage on power lines 157p, 157g into high-frequency AC voltage, for output to power line 158. The high-frequency AC voltage that has been output to power line 158 is transformed in accordance with a turns ratio of the primary and secondary sides of isolation transformer 230, for output to power line 159.

The third full bridge circuit (Q5 to Q8) converts the high-frequency AC voltage that has been output to power line 159 into DC voltage, for output to power lines 152p, 152g. The DC voltage on power lines 152p, 152g is controlled by on/off control of switching elements Q1 to Q8 forming the second and third full bridge circuits.

At the time of external charging, relays RL1, RL2 are turned on, causing main battery 10 to be charged with the DC voltage on power lines 152p, 152g.

By feedback control of output voltage and/or output current, charger 200 outputs DC electric power for charging main battery 10 in accordance with a charge command at the time of external charging. The charge command is set in accordance with a state of main battery 10, for example, SOC (State Of Charge) and temperature.

Then, at the completion of the external charging, ECU 80 turns off relays RL1, RL2. In this way, at the time of external charging, charger 200 performs the first power conversion for converting AC electric power from external power supply 400 into the electric power for charging main battery 10.

AC/DC converter 170 is connected to power line 151 included in the path of the above-described power conversion by charger 200. That is, in the exemplary configurations shown in FIGS. 1 and 2, power line 151 corresponds to the "predetermined node". AC/DC converter 170 converts the AC voltage on power line 151 into auxiliary electric power (level of power supply voltage Vs), for output to power line 155p. AC/DC converter 170 may also be formed integrally with charger 200. AC/DC converter 170 is formed of a switching regulator including a semiconductor switching element (not shown), as with main DC/DC converter 60, and any known circuit configuration may be applied.

As described above, each of the full bridge circuits in power conversion units 210, 220 can execute bi-directional AC/DC power conversion. Therefore, charger 200 can execute second power conversion that is reverse to the first power conversion described above. Specifically, the output voltage of main battery 10 transmitted to power lines 152p, 152g by turning on relays RL1, RL2 is converted by the third full bridge circuit (Q5 to Q8) into high-frequency AC voltage, for output to power line 159. The high-frequency AC voltage transmitted from power line 159 to power line 158 by isolation transformer 230 is then converted by the second full bridge circuit (Q1 to Q4) into DC voltage, for output to power lines 157p, 157g. The first full bridge circuit (Q9 to Q12) in power conversion unit 210 then converts the DC voltage on power lines 157p, 157g into AC voltage for output to power line 151. Thus, the output electric power of main battery 10 can be converted by charger 200 into AC electric power to be returned to external power supply 400 through the charging cable, and/or AC electric power to be output from AC receptacle 120.

With reference to FIG. 1 again, operation of the power supply apparatus at the time of external charging and during running of the vehicle will be described.

At the time of external charging, relays RL1, RL2 are turned on, while system main relays SMR1, SMR2 are turned off. Consequently, main battery 10 is charged with the DC voltage obtained by converting the AC electric power from external power supply 400 by charger 200, by way of relays RL1, RL2 in the ON-state.

Further, system main relays SMR1, SMR2 are in the OFF-state, so that power lines 153p, 153g are electrically disconnected from charger 200 and main battery 10. Therefore, the output voltage (DC voltage VL) of main battery 10 is not applied to equipment of a high voltage system including PCU 20, and hence, reduction in the durability life of components forming the high voltage system equipment due to external charging can be prevented.

As for the low voltage system (auxiliary machinery system), since AC/DC converter 170 is activated at the time of external charging, auxiliary electric power can be supplied to power line 155p, even though system main relays SMR1, SMR2 are turned off. In this way, main DC/DC converter 60 can be stopped, and therefore, electric power loss can be suppressed.

Electric power capacity (output rating) of AC/DC converter 170 is designed to cover the usual power consumption of the auxiliary machinery system (low voltage system) at the time of external charging. Therefore, output rating (for example, an output power rating of about 100 W) of AC/DC converter 170 can be kept lower than output rating (for example, an output power rating of about several kW) of main DC/DC converter 60, which needs to cover power consumption by ECU 80 and auxiliary load group 95 while the vehicle is running.

Therefore, at the time of external charging, main DC/DC converter 60 is stopped, while power supply voltage Vs for the low voltage system is generated by AC/DC converter 170, thereby achieving improved efficiency of external charging.

In electrically powered vehicle 100, while the vehicle is running, system main relays SMR1, SMR2 are turned on. Consequently, the output voltage from main battery 10 is transmitted to power lines 153p, 153g, by way of system main relays SMR1, SMR2 in the ON-state. That is, the electric power on power lines 153p, 153g electrically connected with main battery 10 is used by PCU 20 for controlling driving of motor generator 30.

While the vehicle is running, relays RL1, RL2 are basically turned off. Thus, relays RL1, RL2 are in the OFF-state, so that the external charging components including charger 200 can be electrically disconnected from main battery 10 and power lines 153p, 153g.

In the power supply apparatus for the electrically powered vehicle according to the present embodiment, power feed to the low voltage system (auxiliary machinery system) while the vehicle is running can be switched between a normal mode (a first mode) and a loss increase mode (a second mode). Main DC/DC converter 60 corresponds to the "first power converter", and AC/DC converter 170 corresponds to the "second power converter."

In the normal mode, as described above, ECU 80 turns off relays RL1, RL2 and stops charger 200 and AC/DC converter 170, and generates a power feed instruction only to main DC/DC converter 60. AC/DC converter 170 is thus operated, converting the output electric power of main battery 10 into auxiliary electric power.

In the loss increase mode, in addition to the power feed instruction to main DC/DC converter 60, ECU 80 also generates a power feed instruction to charger 200 and AC/DC converter 170. Further, ECU 80 turns on relays RL1, RL2. Thus, charger 200, AC/DC converter 170, and relays RL1, RL2 operate, in addition to main DC/DC converter 60, in order to supply the auxiliary electric power. For this reason, when the same auxiliary electric power is output, power consumption increases in the second mode as compared to that in the first mode. That is, electric power loss in the power supply apparatus increases.

Main DC/DC converter 60 is provided with a sensor 65 for detecting output current and/or output voltage. Similarly, DC/DC converter 170 is provided with a sensor 175 for detecting output voltage and/or output current.

Sensors 65, 175 are provided to detect output electric power of main DC/DC converter 60 and AC/DC converter 170, respectively. Further, at least one of AC/DC converter 170 and main DC/DC converter 60 is configured to be capable of controlling its output electric power.

Generally, main DC/DC converter 60 is configured as a constant voltage regulator that outputs constant voltage in accordance with a voltage command value. Therefore, by providing, as sensor 65, a current sensor for detecting output current of main DC/DC converter 60, the output electric power of main DC/DC converter 60 can be detected. Moreover, by varying the voltage command value for main DC/DC converter 60, the output electric power of main DC/DC converter 60 can be controlled equivalently.

Similarly, by also providing AC/DC converter 170 with sensor 175 for detecting output current, the output electric power can be detected. Moreover, the output electric power of AC/DC converter 170 can be controlled by adjusting an output voltage command value or an output current command value.

In this way, the power supply apparatus for the electrically powered vehicle shown in FIG. 1 is configured to be capable of controlling a ratio between output electric power of main DC/DC converter 60 and output electric power of AC/DC converter 170, with respect to a total electric power supply Ptl from main DC/DC converter 60 and AC/DC converter 170.

Power to be consumed by auxiliary load group 95 is supplied based on a sum of total electric power supply Ptl and electric power charged to/discharged from auxiliary battery 70. Further, by varying the output voltage or output current of main DC/DC converter 60 and/or AC/DC converter 170, it is possible to vary total electric power supply Ptl, as well as the ratio between the output electric power of main DC/DC converter 60 and output electric power of AC/DC converter 170.

Figure 3:
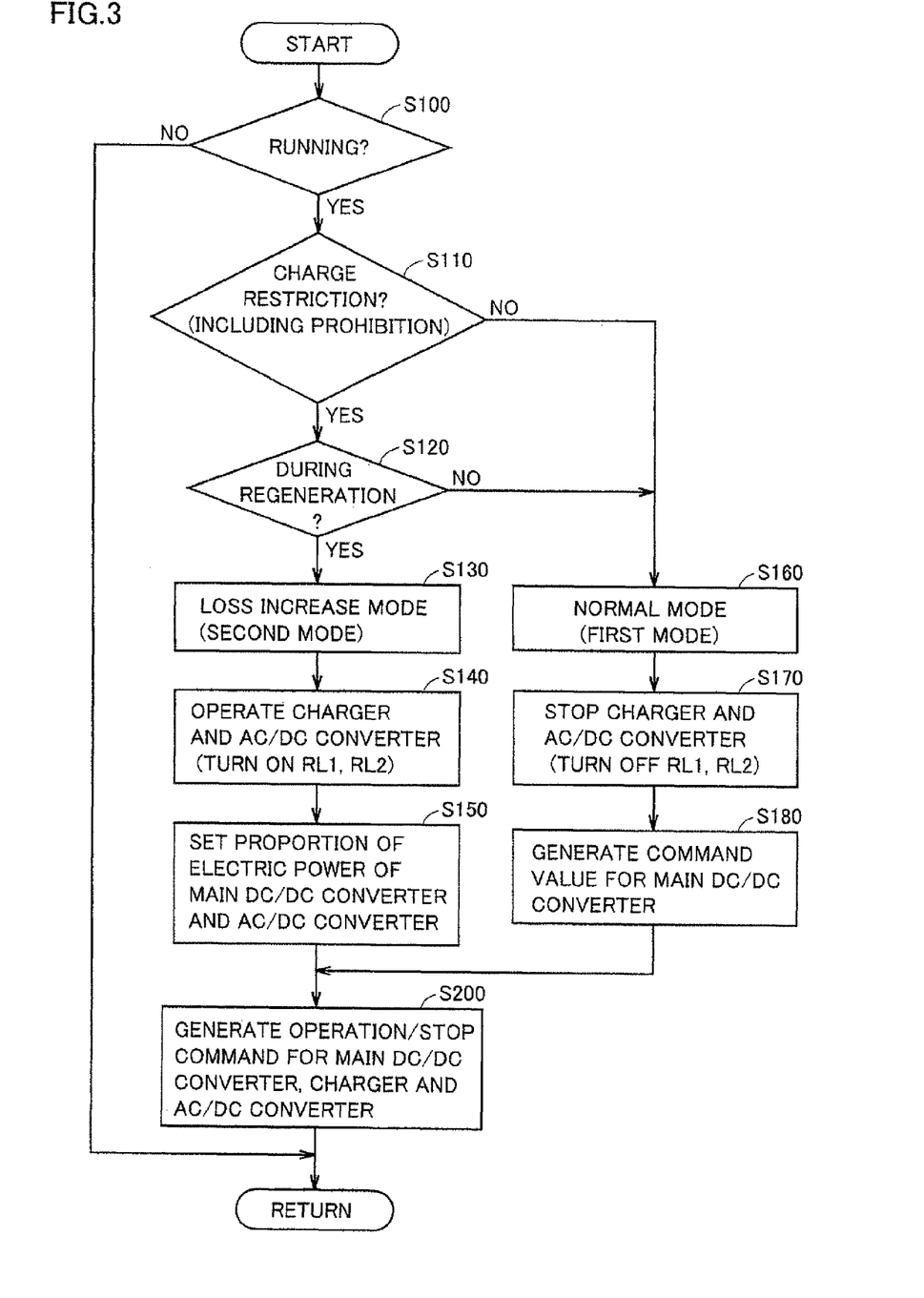
FIG. 3 is a flowchart for illustrating control operation for an auxiliary power feed system while the vehicle is running, in the power supply apparatus for the electrically powered vehicle in accordance with the embodiment of the present invention.

FIG. 3 is a flowchart for illustrating control operation for auxiliary power feed while the vehicle is running, in the power supply apparatus for an electrically powered vehicle in accordance with the embodiment of the present invention. The control processing shown in FIG. 3 is executed by ECU 80 every predetermined period. The control processing at each step shown in FIG. 3 is executed by means of hardware processing and/or software processing by ECU 80.

With reference to FIG. 3, ECU 80 determines at step S100 whether the vehicle is running or not. In the case where the vehicle is not running, including the time of external charging (when the determination at S100 is NO), the control processing described below is not executed.

Where the vehicle is running (when the determination at S100 is YES), ECU 80 proceeds to step S110, where it determines whether charging of main battery 10 is restricted or not. If the restriction on charging proceeds, charge power upper limit value Win for main battery 10 is set to zero, whereby charging of main battery 10 is prohibited. That is, the "charge restriction" determined at step S110 is a concept including "charge prohibition". Here, when Win=0 (that is, when the charge is prohibited), a YES determination is made at step S100.

ECU 80 determines at step S120 whether electrically powered vehicle 100 is being regeneratively braked or not, that is, whether motor generator 30 is generating regenerative electric power or not.

Based on the results of determination at steps S110 and S120, one of the first mode (normal mode) and the second mode (loss increase mode) is selected for the auxiliary power feed.

In the example shown in FIG. 3, when the determination is YES at both steps S110 and S120, that is, when regenerative electric power is being generated and charging of main battery 10 is prohibited, ECU 80 proceeds to step S130, where it selects the loss increase mode (second mode).

When the determination is NO at at least one of steps S110 and S120, ECU 80 proceeds to step S160, where it selects the normal mode (first mode).

When ECU 80 selects the normal mode, it stops charger 200 and AC/DC converter 170 and turns off relays RL1, RL2 at step S170. Then at step S180, ECU 80 generates an output command value for main DC/DC converter 60. Generally, the output voltage of main DC/DC converter 60 is controlled to a constant voltage.

On the other hand, when ECU 80 selects the loss increase mode, it activates charger 200 and AC/DC converter 170 and turns on relays RL1, RL2 at step S140.

Figure 4:
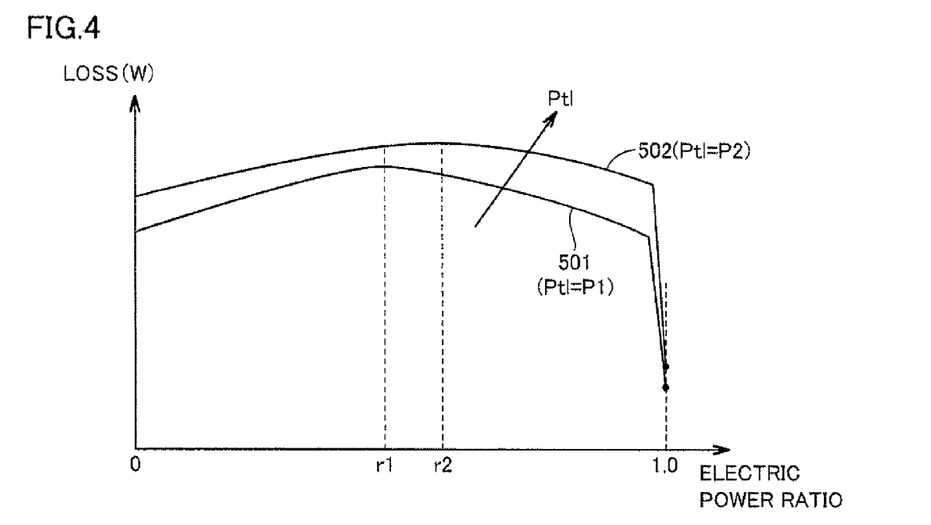
FIG. 4 is a graph showing a relation between electric power loss and a ratio of output electric power between a main DC/DC converter and an AC/DC converter.

FIG. 4 is a graph showing a relation between electric power loss and a ratio of output electric power between main DC/DC converter 60 and AC/DC converter 170.

The horizontal axis in FIG. 4 represents a ratio of output electric power (electric power ratio) of main DC/DC converter 60 with respect to total electric power supply Ptl from main DC/DC converter 60 and AC/DC converter 170. Electric power ratio=1.0 represents a state in which only main DC/DC converter 60 is operating, that is, a state in which the normal mode has been selected. Electric power ratio <1.0, on the other hand, represents a state in which the loss increase mode has been selected.

The vertical axis in FIG. 4 represents the electric power loss throughout the power supply apparatus in the auxiliary power feed. In FIG. 4, a characteristic when total electric power supply Ptl=P1 is represented by numeral 501, and a characteristic when Ptl=P2 (P2>P1) is represented by numeral 502.

It is understood from FIG. 4 that transition from the first mode to the second mode leads to increase in loss throughout the power supply apparatus, owing to the power consumption by charger 200, AC/DC converter 170, and relays RL1, RL2. It is also understood that in the second mode, the loss changes in accordance with the electric power ratio, and therefore, there is an electric power ratio at which the loss is maximum. The electric power ratio at which the loss is maximum changes in accordance with total electric power supply Ptl.

Therefore, in the second mode in which the loss is intentionally increased, an optimum electric power ratio, that is, an electric power ratio Pr at which the loss in the power supply apparatus is maximum, can be found in advance through an experiment or the like in accordance with total electric power supply Ptl.

Figure 5:
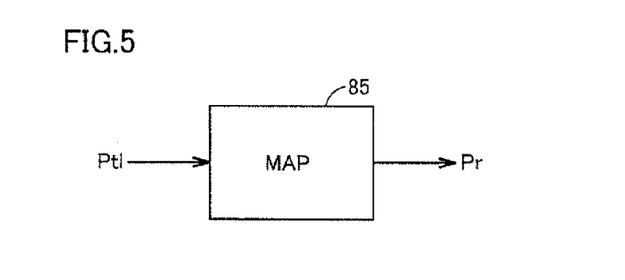
FIG. 5 is a conceptual diagram showing a map in which a relation between auxiliary electric power and an electric power ratio at which loss is maximum has been stored in advance.

As shown in FIG. 5, a map 85 can be formed in which a relation between total electric power supply Ptl and an electric power ratio at which the loss is maximum has been stored in advance. Map 85 is stored in, for example, a memory incorporated in ECU 80.

With reference to FIG. 3 again, subsequent to step S140, ECU 80 proceeds to step S150. At step S150, ECU 80 calculates total electric power supply Ptl based on the outputs of sensors 65, 175, and finds, based on the calculated total electric power supply Ptl, electric power ratio Pr at which the loss is maximum, by referring to map 85 (FIG. 5). Then, a proportion of the output electric power of main DC/DC converter 60 and a proportion of the output electric power of AC/DC converter 170 in accordance with optimum electric power ratio Pr can be set. ECU 80 generates a command value for each of main DC/DC converter 60 and AC/DC converter 170 to realize the above proportions of electric power.

Then at step S200, ECU 80 generates an operation or stop command for each of main DC/DC converter 60, charger 200, and AC/DC converter 170, in accordance with the settings made at steps S140, S150, S160, and S170.

It is noted that the following modifications can also be made for steps S110 and S120 for selecting the first or second mode. For example, step S120 may not be provided, and the control processing may be modified such that when charging of main battery 10 is prohibited, even if regenerative electric power is not being generated, the second mode is selected to increase the electric power discharged from main battery 10.

Further, as for step S110, even if charging of main battery 10 is not prohibited, in order to make a YES determination when charging is restricted to some degree, ECU 80 may determine whether the relation |Win|<α (α: a predetermined threshold) is satisfied or not. In any case, in the power supply apparatus for the electrically powered vehicle according to the present embodiment, during running of the vehicle, the first or second mode is selected in accordance with at least one of the charge restriction (or charge prohibition) of main battery 10 and the regenerative electric power generated by motor generator 30.

As described above, in the power supply apparatus for the electrically powered vehicle according to the embodiment of the present invention, when there is little (or no) room for receiving regenerative electric power generated by motor generator 30 because of the charge restriction (or charge prohibition) of main battery 10, the second mode can be selected to thereby increase the loss in the auxiliary power feed system. This allows the generated regenerative electric power to be consumed. Alternatively, by consuming the electric power of main battery 10 preliminarily before regenerative braking, it is possible to ensure room for receiving the regenerative electric power. Therefore, even where charging of main battery 10 is restricted or prohibited, continuous inability to generate regenerative braking force can be avoided. As a result, generation of heat from the mechanical braking mechanism can be suppressed.

(Modification of Auxiliary Power Feed Configuration in External Charging System)

Figure 6:
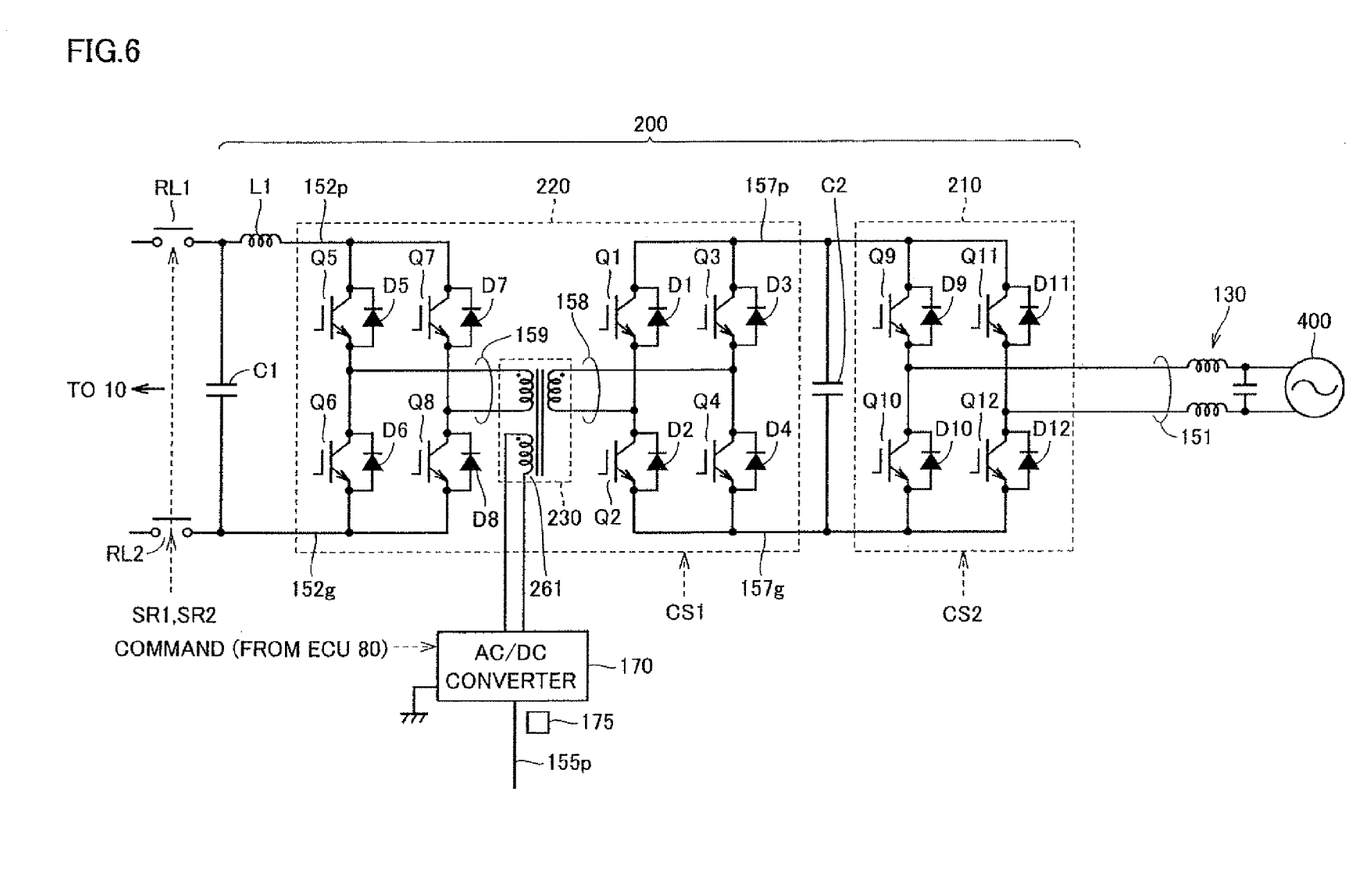
FIG. 6 is a circuit diagram showing a first modification of the power supply apparatus for the electrically powered vehicle according to the embodiment of the present invention.

FIG. 6 is a circuit diagram showing a first modification of the power supply apparatus for the electrically powered vehicle according to the embodiment of the present invention.

From a comparison of FIG. 6 with FIG. 2, in the first modification, charger 200 is different from that shown in FIG. 2 in the configuration of isolation transformer 230 of power conversion unit 220. Since charger 200 is otherwise the same in configuration as that shown in FIG. 2, detailed description thereof will not be repeated.

Isolation transformer 230, as compared with the configuration shown in FIG. 2, further has a coil winding 261. Coil winding 261 can be formed by providing isolation transformer 230 in FIG. 2 further with a tap. AC/DC converter 170 is then connected to coil winding 261 of isolation transformer 230. That is, in the configuration shown in FIG. 6, coil winding 261 corresponds to the "predetermined node."

AC/DC converter 170 converts AC voltage generated in coil winding 261 into auxiliary electric power, which is generated on power line 155p. Therefore, during external charging, AC/DC converter 170 can generate auxiliary electric power from the electric power of isolation transformer 230 (coil winding 261) in the course of the path of power conversion by charger 200, by using AC electric power from external power supply 400 as a source.

Further, while the vehicle is running, by turning on relays RL1, RL2 and operating charger 200, AC/DC converter 170 converts AC voltage generated in coil winding 261 by using electric power from main battery 10 as a source, thereby outputting auxiliary electric power.

Accordingly, the control processing shown in FIG. 3 can also be applied to the first modification shown in FIG. 6. That is, while the vehicle is miming, auxiliary electric power can be generated by selecting the first mode or the second mode.

Figure 7:
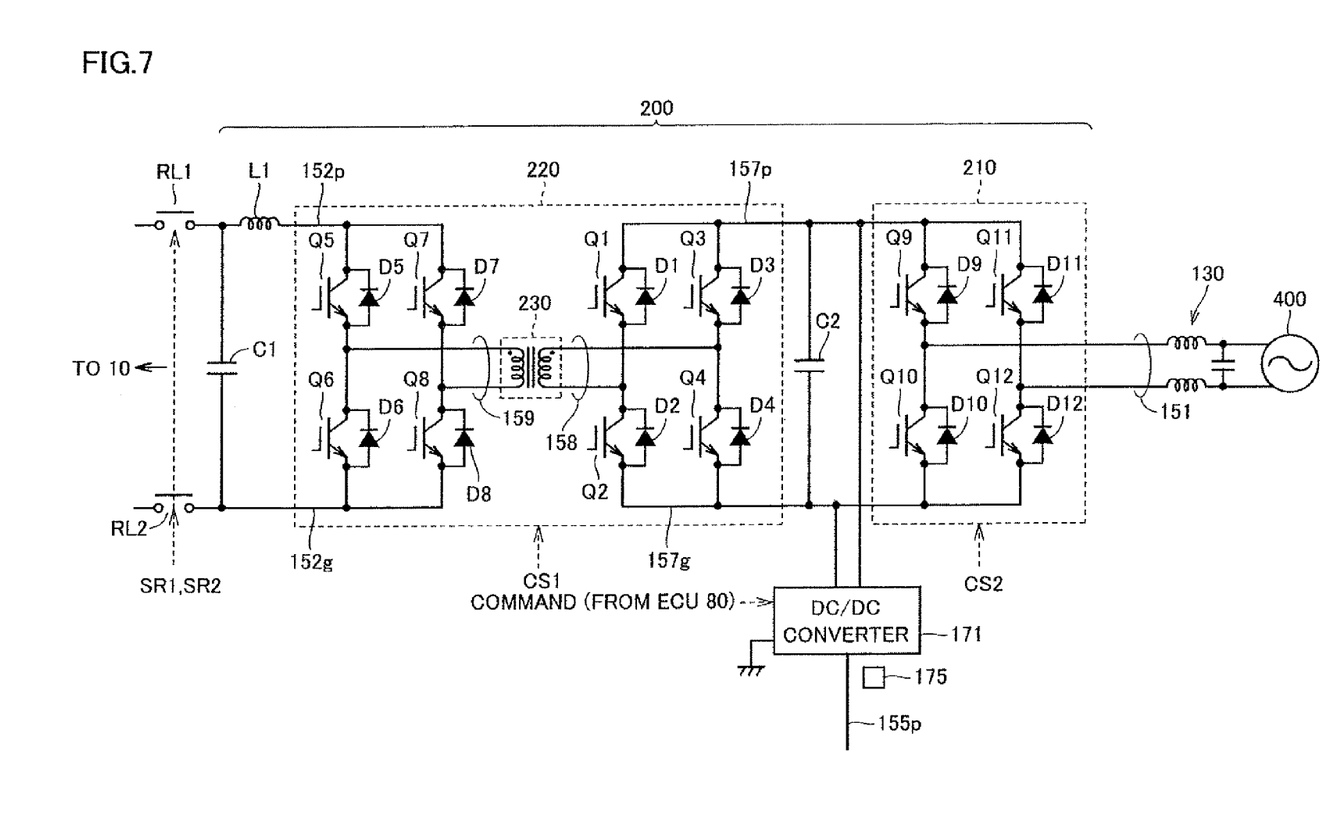
FIG. 7 is a circuit diagram showing a second modification of the power supply apparatus for the electrically powered vehicle according to the embodiment of the present invention.

FIG. 7 is a circuit diagram showing a second modification of the power supply apparatus for the electrically powered vehicle according to the embodiment of the present invention.

From a comparison of FIG. 7 with FIG. 2, in the second modification, a subDC/DC converter 171, in place of AC/DC converter 170, is provided as a "second power converter". SubDC/DC converter 171 is connected to power lines 157p, 157g. That is, in the configuration shown in FIG. 7, power lines 157p, 157g correspond to the "predetermined node". It is noted that electric power capacity (output rating) of subDC/DC converter 171 is equivalent to that of AC/DC converter 170.

SubDC/DC converter 171 converts DC voltage generated on power lines 157p, 157g into auxiliary electric power by the first power conversion by charger 200, and generates the converted power on power line 155p. Therefore, during external charging, subDC/DC converter 171 can generate auxiliary electric power from electric power on power lines 157p, 157g in the course of the path of power conversion by charger 200, by using AC electric power from external power supply 400 as a source.

Further, while the vehicle is running, by turning on relays RL1, RL2 and operating charger 200, DC electric power can be generated on power lines 157p, 157g by the second power conversion by charger 200. Therefore, by converting the DC electric power generated on power lines 157p, 157g by subDC/DC converter 171, auxiliary electric power can be output by using electric power from main battery 10 as a source.

As a result, the control processing shown in FIG. 3 can also be applied to the second modification shown in FIG. 7. That is, while the vehicle is running, auxiliary electric power can be generated by selecting the first mode or the second mode.

As in the modifications shown in FIGS. 6 and 7, it is also possible to provide AC/DC converter 170 or subDC/DC converter 171 for generating auxiliary electric power (that is, the second power converter) in the course of the path of power conversion by charger 200 between main battery 10 and power line 151.

It is noted that in the power supply apparatus for the electrically powered vehicle according to the present embodiment and its modifications, the components subsequent to power lines 153p, 153g (vehicle running system) are not limited to those shown in the figures. That is, as described above, the present invention can be commonly applied to electrically powered vehicles equipped with traction motor(s), such as an electric vehicle, a hybrid vehicle, a fuel cell vehicle, and the like, without limitations on the number of traction motors and the configuration of the driving system.

It should be understood that the embodiments disclosed herein are illustrative and non-restrictive in every respect. The scope of the present invention is defined by the terms of the claims, rather than by the foregoing description, and is intended to include any modifications within the scope and meaning equivalent to the terms of the claims.

INDUSTRIAL APPLICABILITY

The present invention can be applied to an electrically powered vehicle equipped with a main power storage device and a subpower storage device which are chargeable by a power supply outside the vehicle.

REFERENCE SIGNS LIST

10: main battery, 20: PCU, 26: inverter, 30: motor generator, 40: motive power transmission gear, 50: driving wheel, 55: braking mechanism, 60: main DC/DC converter, 65, 175, 175: sensor, 70: auxiliary battery, 85: map (electric power ratio), 95: auxiliary load group, 100: electrically powered vehicle, 105: charging connector, 120: AC receptacle, 130: LC filter, 151, 152p, 152g, 153p, 153g, 154p, 155p, 157p, 157g, 158, 159: power line, 170: AC/DC converter, 171: subDC/DC converter, 200: charger, 210, 220, 250: power conversion unit, 230: isolation transformer, 261: coil winding, 400: external power supply, 405: relay (charging cable), 410: charging plug, C0, C1, C2, CH: capacitor, CNV: converter, CS1, CS2: control signal (charger), D1 to D12: antiparallel diode, L0, L1: reactor; Pr: electric power ratio, Ptl: total electric power supply, Q1 to Q12, Qa, Qb: power semiconductor switching element, RL1, RL2: relay, SM1, SM2, SR1, SR2: control command (relay), SMR1, SMR2: system main relay, VH, VL: DC voltage; Vs: power supply voltage (auxiliary machinery system).

The invention claimed is:

1. A power supply apparatus for an electrically powered vehicle comprising:
a main power storage device;
a power control unit configured to control output of an electric motor by power conversion between said main power storage device and said electric motor configured to be capable of supplying and receiving driving force to and from a wheel;
a subpower storage device having output voltage lower than that of said main power storage device;
a power line connected to said subpower storage device, for supplying auxiliary electric power for operating an auxiliary load;
a first power converter for converting output electric power of said main power storage device into said auxiliary electric power for output to said power line;
a charger for executing, during external charging, first power conversion for converting electric power from an external power supply into electric power for charging said main power storage device;
a second power converter connected to a predetermined node on a path of said first power conversion, for converting electric power on said predetermined node into said auxiliary electric power for output to said power line; and
a control device for controlling operation of each of said charger, said first power converter, and said second power converter,
said first power converter outputting said auxiliary electric power by operating in response to a first auxiliary power feed instruction from said control device,
said charger being configured to execute, while the vehicle is running, second power conversion for converting electric power of said main power storage device into electric power to be input to said second power converter and outputting the converted electric power to said predetermined node, by at least partial reverse conversion of said first power conversion, in response to a second auxiliary power feed instruction from said control device,
said second power converter outputting, while said vehicle is running, said auxiliary electric power by operating in response to said second auxiliary power feed instruction from said control device, and
said control device controlling, while said vehicle is running, said charger, said first power converter, and said second power converter to generate said auxiliary electric power, by switching between a first mode in which only said first auxiliary power feed instruction is generated and a second mode in which both said first and second auxiliary power feed instructions are generated, in accordance with at least one of charge restriction of said main power storage device and regenerative electric power from said electric motor.

2. The power supply apparatus for the electrically powered vehicle according to claim 1, wherein
said control device selects, while said vehicle is running, said second mode when charging of said main power storage device is prohibited.

3. The power supply apparatus for the electrically powered vehicle according to claim 2, wherein
said control device controls, when said second mode is selected, a ratio (Pr) between output electric power of said first power converter and output electric power of said second power converter, in accordance with total output electric power from said first and second power converters.

4. The power supply apparatus for the electrically powered vehicle according to claim 3, wherein
said control device sets said ratio (Pr) when said second mode is selected, based on a map obtained by finding in advance said ratio at which a total of losses in said first and second power converters is maximum, for each said total output electric power.

5. The power supply apparatus for the electrically powered vehicle according to claim 1, wherein
said control device selects, while said vehicle is running, said second mode when said electric motor is generating regenerative electric power and a charge power upper limit value for said main power storage device is lower than a predetermined value.

6. The power supply apparatus for the electrically powered vehicle according to claim 5, wherein
said control device controls, when said second mode is selected, a ratio (Pr) between output electric power of said first power converter and output electric power of said second power converter, in accordance with total output electric power from said first and second power converters.

7. The power supply apparatus for the electrically powered vehicle according to claim 6, wherein
said control device sets said ratio (Pr) when said second mode is selected, based on a map obtained by finding in advance said ratio at which a total of losses in said first and second power converters is maximum, for each said total output electric power.

8. The power supply apparatus for the electrically powered vehicle according to claim 1, wherein
said control device controls, when said second mode is selected, a ratio (Pr) between output electric power of said first power converter and output electric power of said second power converter, in accordance with total output electric power from said first and second power converters.

9. The power supply apparatus for the electrically powered vehicle according to claim 8, wherein
said control device sets said ratio (Pr) when said second mode is selected, based on a map obtained by finding in advance said ratio at which a total of losses in said first and second power converters is maximum, for each said total output electric power.

10. A method for controlling a power supply apparatus for an electrically powered vehicle including a main power storage device and a subpower storage device having output voltage lower than that of said main power storage device, said power supply apparatus including
a power control unit configured to control output of an electric motor by power conversion between said main power storage device and said electric motor configured to be capable of supplying and receiving driving force to and from a wheel,
a power line connected to said subpower storage device, for supplying auxiliary electric power for operating an auxiliary load,
a first power converter for converting output electric power of said main power storage device into said auxiliary electric power for output to said power line,
charger for executing, during external charging, first power conversion for converting electric power from an external power supply into electric power for charging said main power storage device, and
a second power converter connected to a predetermined node on a path of said first power conversion, for converting electric power on said predetermined node into said auxiliary electric power for output to said power line,
said first power converter outputting said auxiliary electric power by operating in response to a first auxiliary power feed instruction,
said charger being configured to execute, while the vehicle is running, second power conversion for converting electric power of said main power storage device into electric power to be input to said second power converter and outputting the converted electric power to said predetermined node, by at least partial reverse conversion of said first power conversion, in response to a second auxiliary power feed instruction, and
said second power converter outputting, while said vehicle is running, said auxiliary electric power by operating in response to said second auxiliary power feed instruction,
said method comprising the steps of:
selecting, while said vehicle is running, one of a first mode in which only said first auxiliary power feed instruction is generated and a second mode in which both said first and second auxiliary power feed instructions are generated, in accordance with at least one of charge restriction of said main power storage device and regenerative electric power from said electric motor; and
controlling said charger, said first power converter, and said second power converter to generate said auxiliary electric power in accordance with said first or second mode selected.

11. The method for controlling the power supply apparatus for the electrically powered vehicle according to claim 10, wherein
said step of controlling includes the step of setting, when said second mode is selected, a ratio (Pr) between output electric power of said first power converter and output electric power of said second power converter, in accordance with total output electric power (Ptl) from said first and second power converters.

12. The method for controlling the power supply apparatus for the electrically powered vehicle according to claim 11, wherein
in said step of setting, said ratio when said second mode is selected is set, based on a map obtained by finding in advance said ratio (Pr) at which a total of losses in said first and second power converters is maximum, for each said total output electric power (Ptl).

* * * * *